(12) United States Patent
Ohashi et al.

(10) Patent No.: US 8,653,783 B2
(45) Date of Patent: Feb. 18, 2014

(54) AC MOTOR DRIVE DEVICE

(75) Inventors: Manabu Ohashi, Chiyoda-ku (JP);
Kazuya Nakamura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/978,813

(22) PCT Filed: Mar. 31, 2011

(86) PCT No.: PCT/JP2011/058267
§ 371 (c)(1),
(2), (4) Date: Jul. 9, 2013

(87) PCT Pub. No.: WO2012/131995
PCT Pub. Date: Oct. 4, 2012

(65) Prior Publication Data
US 2013/0285582 A1     Oct. 31, 2013

(51) Int. Cl.
*H02P 23/00*     (2006.01)

(52) U.S. Cl.
USPC ........ 318/811; 318/376; 318/400.3; 318/139; 363/131; 363/37; 363/79; 363/89; 363/41; 219/622; 219/676; 323/283

(58) Field of Classification Search
USPC ................. 318/684, 377, 801, 139, 268, 376, 318/400.3, 800, 811, 722, 12, 138, 105, 318/262, 375, 224, 381, 732, 823; 363/132, 363/17, 37, 39, 40, 41, 124, 126, 131, 139; 307/66, 43, 44, 45, 47, 50, 64, 72; 219/626, 622, 676; 320/116, 118, 137, 320/138; 310/195, 198
See application file for complete search history.

(56) References Cited

U.S. PATENT DOCUMENTS

| | | | | |
|---|---|---|---|---|
| 4,095,154 | A | * | 6/1978 | Williamson ................ 318/376 |
| 5,138,249 | A | * | 8/1992 | Capel ........................ 323/283 |
| 5,563,479 | A | * | 10/1996 | Suzuki ...................... 318/139 |
| 8,143,836 | B2 | | 3/2012 | Iwashita et al. |
| 2009/0237016 | A1 | * | 9/2009 | Iwashita et al. ........... 318/400.3 |

FOREIGN PATENT DOCUMENTS

| | | | |
|---|---|---|---|
| JP | 2000-262072 A | | 9/2000 |
| JP | 3121378 B2 | | 10/2000 |
| JP | 2001-103769 A | | 4/2001 |
| JP | 2001-268900 A | | 9/2001 |
| JP | 2001-320893 A | | 11/2001 |
| JP | 2003-111493 A | | 4/2003 |
| JP | 2003111493 A | * | 4/2003 |
| JP | 2005-057846 A | | 3/2005 |
| JP | 2005057846 A | * | 3/2005 |
| JP | 2005-324879 A | | 11/2005 |
| JP | 2008-099503 A | | 4/2008 |
| JP | 2009-232537 A | | 10/2009 |
| JP | 2009-247193 A | | 10/2009 |

* cited by examiner

*Primary Examiner* — Eduardo Colon Santana
*Assistant Examiner* — Jorge Carrasquillo
(74) *Attorney, Agent, or Firm* — Sughrue Mion, PLLC; Richard Turner

(57) ABSTRACT

A circuit switching element is provided that switches a step-up/step-down bidirectional chopper circuit, arranged between a DC bus and a power storage element, to a first chopper circuit or to a second chopper circuit, whose step-up and step-down characteristics are in a complementary relation. The first and second chopper circuits are used together at a time of charge and discharge. Accordingly, an AC motor drive device having mounted therein a power storage system is obtained, in which the power storage system can perform charge and discharge to and from the power storage element, regardless of a bus voltage and can increase energy use efficiency.

9 Claims, 10 Drawing Sheets

AC MOTOR DRIVE DEVICE

CROSS REFERENCE TO RELATED APPLICATIONS

This is a National Stage of International Application No. PCT/JP2011/058267, filed Mar. 31, 2011, the contents of all of which are incorporated herein by reference in their entirety.

FIELD

The present invention relates to an AC motor drive device that converts DC power from a DC power source to AC power by an inverter and supplies AC power to an AC motor, and more particularly to an AC motor drive device including a power storage system that controls DC power.

BACKGROUND

In an AC motor drive device, while a large drive current flows for acceleration at the time of power running of the AC motor, a regenerative current is generated at the time of deceleration. If such regenerative power of the motor is simply consumed by a resistor and discharged as heat, energy use efficiency deteriorates, which is not desirable.

Conventionally, therefore, a power storage system is put between a DC-operated inverter and an AC-operated inverter, in parallel with the inverters. The energy storage system includes a power storage element such as a large-capacity electrolytic capacitor or an electric double layer capacitor, a DC/DC converter provided between the power storage element and a DC bus of a DC-operated converter, and a control circuit that controls the DC/DC converter to perform charge and discharge between the DC bus and the power storage element.

For example, as described in Patent Literatures 1, 2, and 3, in an AC motor drive device having a power storage system mounted therein, at the time of power running, power accumulated in a power storage element is discharged to a DC bus by a DC/DC converter, which is then converted to AC power by an inverter and supplied to an AC motor. On the other hand, at the time of regeneration of the motor, the regenerative power causes a voltage of the DC bus to rise via the inverter. Therefore, the bus voltage is charged and accumulated in the power storage element by the DC/DC converter. Thereafter, power accumulated in the power storage element is discharged to the DC bus by the DC/DC converter, thereby performing power regeneration. Accordingly, in the AC motor drive device having the power storage system mounted therein, leveling of a motor drive current can be realized and the regenerative power can be effectively used.

CITATION LIST

Patent Literatures

Patent Literature 1: Japanese Patent Application Laid-open No. 2001-103769
Patent Literature 2: Japanese Patent Application Laid-open No. 2001-320893
Patent Literature 3: Japanese Patent Application Laid-open No. 2008-99503
Patent Literature 4: Japanese Patent No. 3121378
Patent Literature 5: Japanese Patent Application Laid-open No. 2001-268900

SUMMARY

Technical Problem

As the DC/DC converter used for the power storage system, a bidirectional step-up/step-down chopper circuit that can execute charge control from a DC bus to a power storage element and discharge control from the power storage system to the DC bus can be used. In this case, at the time of charge from the DC bus to the power storage element, even if the power storage element has accumulated sufficient power, the charge voltage may not be set to the voltage equal to or higher than the bus voltage, or at the time of discharge from the power storage element to the DC bus, even if discharge can be performed from the power storage element, discharge can be performed only up to the voltage equal to or higher than the bus voltage, depending on whether a switching circuit side of the step-up/step-down chopper circuit is connected to the DC bus and a choke coil is connected to the power storage element, or these are connected in a reverse relation.

To solve this problem, for example, it can be considered to adopt a configuration in which two switching circuits are connected in series and controlled, as described in Patent Literatures 4 and 5. According to this configuration, charge from a DC bus to a power storage element and discharge from the power storage element to the DC bus can be performed, regardless of bus voltages. However, the circuit configuration is complicated, and control is complicated as well. In addition, because a power loss occurs in each of the switching circuits of the two circuits, energy conversion efficiency decreases.

The present invention has been achieved to solve the above problems, and an object of the present invention is to provide an AC motor drive device having mounted therein a power storage system that can perform charge and discharge to and from a power storage element regardless of bus voltages and can improve energy use efficiency, without providing two switching circuits in a bidirectional step-up/step-down chopper circuit used in a power storage system.

Furthermore, another object of the present invention is to provide an AC motor drive device having mounted therein a highly safe power storage system that prevents breakage influence by which power accumulated in a power storage element causes damage or breakage in other devices including a bidirectional step-up/step-down chopper circuit to be used in the power storage system, at the time of occurrence of an abnormality.

Solution to Problem

The present invention is directed to an AC motor drive device that achieves the objects. The AC motor drive device includes a DC bus connected to a DC power supply; an inverter that converts DC power supplied from the DC bus to AC power required for driving an AC motor; and a power storage system that is connected to the DC bus in parallel with the inverter for controlling DC power of the DC bus. The power storage system includes a power storage element that can store DC power; a step-up/step-down bidirectional chopper circuit that includes two switching elements in series and a choke coil whose one end is connected to a serially connected terminal of the two switching elements, and is arranged between the DC bus and the power storage element to perform a charge operation from the DC bus to the power storage element and a discharge operation from the power storage element to the DC bus; a circuit switching element that switches a configuration of the step-up/step-down bidirectional chopper circuit to a first chopper circuit in which a positive terminal of one of the switching elements is connected to a positive side of the DC bus and the other end of the choke coil is connected to a positive terminal of the power storage element, or to a second chopper circuit in which the other end of the choke coil is connected to the positive terminal of the DC bus and the positive terminal of the one switching element is connected to the positive terminal of the power storage element; and a control circuit that compares a voltage of the DC bus with a voltage of the power storage element, and before and after a timing at which a result of the comparison is changed, causes the circuit switching element to switch to the first chopper circuit or the second chopper circuit to operate the first chopper circuit and the second chopper circuit in a predetermined order, thereby realizing the charge operation and the discharge operation, respectively.

Advantageous Effects of Invention

According to the present invention, when the first chopper circuit or the second chopper circuit is used separately, one of a charge operation and a discharge operation is affected by a bus voltage. However, by focusing attention on the fact that the first and second chopper circuits have complementary step-up and step-down characteristics that complement each other's defects, the first and second chopper circuits are used together at the time of charge and discharge. Accordingly, it becomes possible to realize an AC motor drive device having mounted therein a power storage system that can perform charge and discharge to and from a power storage element regardless of bus voltages, and can improve energy use efficiency.

DESCRIPTION OF EMBODIMENTS

Exemplary embodiments of an AC motor drive device according to the present invention will be explained below in detail with reference to the accompanying drawings. The present invention is not limited to the embodiments.

First Embodiment

Figure 1:
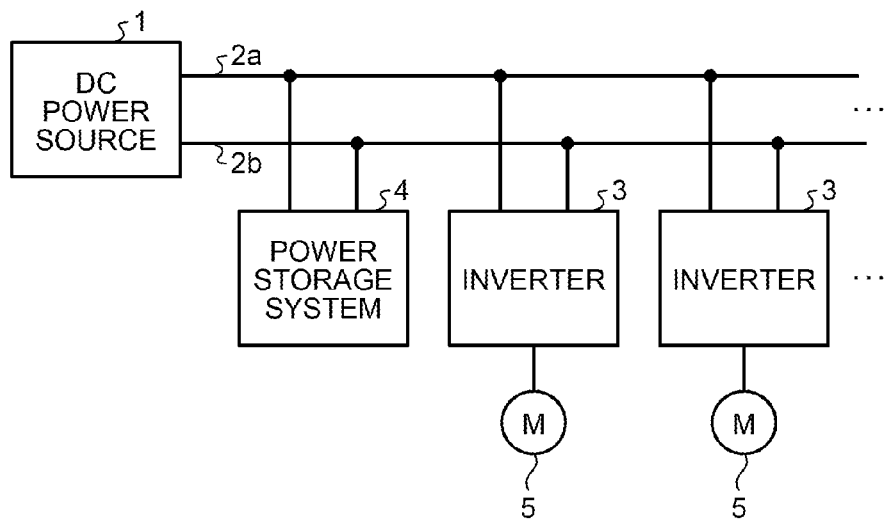
FIG. 1 is a block diagram of a configuration of an AC motor drive device according to a first embodiment of the present invention.

FIG. 1 is a block diagram of a configuration of an AC motor drive device according to a first embodiment of the present invention. In FIG. 1, in the AC motor drive device according to the first embodiment, a plurality of inverters 3, 3, . . . are connected in parallel to positive and negative DC buses 2a and 2b, to which DC power is supplied from a DC power source 1, and a power storage system 4 is connected to the DC buses 2a and 2b between the DC power source 1 and the inverters 3, in parallel with the inverters 3. AC motors 5, 5, . . . are respectively connected to each of the inverters 3, 3, . . . .

The inverters 3, 3, . . . respectively generate desired AC power from the DC power of the DC buses 2a and 2b to drive the respective AC motors 5, 5, . . . . In FIG. 1, a case where there are a plurality of pairs of the inverter 3 and the AC motor 5 is shown. However, there can be only one pair of the inverter 3 and the AC motor 5. Because the power storage system 4 to be mounted is one, the number of pairs of the inverters and the AC motors does not pose any problem at the time of applying the present embodiment. Because the configuration of the inverter 3 is well known, configurations of the DC power source 1 and the power storage system 4 are explained.

Figure 2:
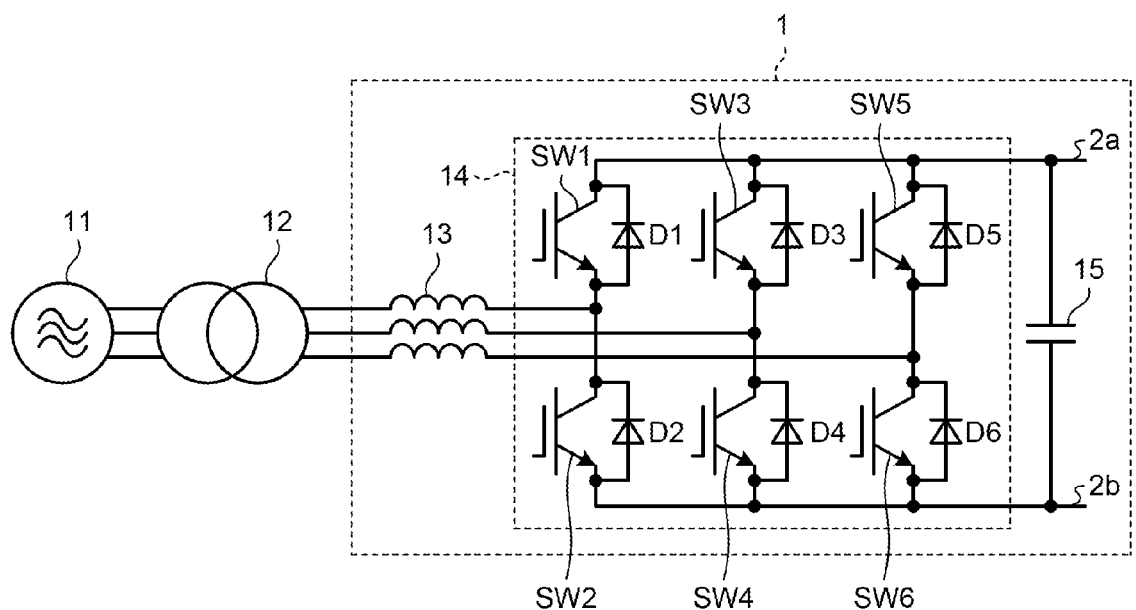
FIG. 2 is a circuit diagram of details of parts related to a DC power source shown in FIG. 1.

FIG. 2 is a circuit diagram of details of parts related to a DC power source shown in FIG. 1. In FIG. 2, the DC power source 1 shown in FIG. 1 includes a reactor 13, a full-wave rectifier circuit 14, and a smoothing capacitor 15.

The full-wave rectifier circuit 14 has such a configuration that three pairs of upper and lower arm switching elements (SW1 and SW2), (SW3 and SW4), and (SW5 and SW6) are connected in parallel. For example, the switching elements SW1 to SW6 are respectively an IGBT, and reflux diodes D1 to D6 are respectively connected in inverse parallel with the switching elements SW1 to SW6.

Respective series connection terminals of the three pairs of upper and lower arm switching elements (SW1 and SW2), (SW3 and SW4), and (SW5 and SW6) connected in series form three-phase AC input terminals. The three-phase AC input terminals are connected to a three-phase AC power source 11 via the reactor 13 and a transformer 12. Opposite ends (parallel connection terminals) of the upper and lower arm switching elements (SW1 and SW2), (SW3 and SW4), and (SW5 and SW6) form DC output terminals (positive output terminals and negative output terminals), and the positive and negative DC buses 2a and 2b are connected thereto.

The full-wave rectifier circuit 14 performs switching of a three-phase AC voltage at a timing at which operations of the switching elements SW1 to SW6 do not overlap on each other, thereby performing rectification. The smoothing capacitor 15 is provided between the positive and negative DC buses 2a and 2b, to smooth the rectified voltage to be output to the positive and negative DC buses 2a and 2b by the full-wave rectifier circuit 14, thereby forming a predetermined DC voltage (a DC power source) between the positive and negative DC buses 2a and 2b.

In the full-wave rectifier circuit 14, in a power regeneration mode in which accumulated regenerative power is discharged from the power storage system 4 to the DC buses 2a and 2b, the switching elements SW1 to SW6 are controlled so that the regenerative power is regenerated to the AC power source 11.

Figure 3:
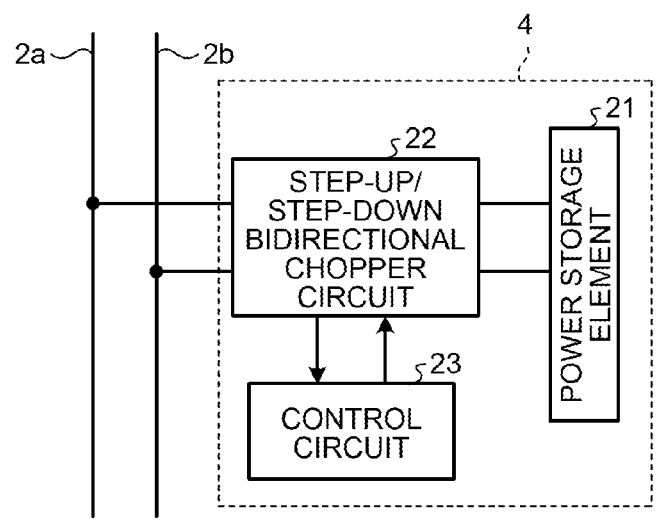
FIG. 3 is a block diagram of a configuration of a power storage system shown in FIG. 1.

FIG. 3 is a block diagram of a configuration of the power storage system shown in FIG. 1. As shown in FIG. 3, the power storage system 4 includes a power storage element 21, a step-up/step-down bidirectional chopper circuit 22, and a control circuit 23.

Figure 4:
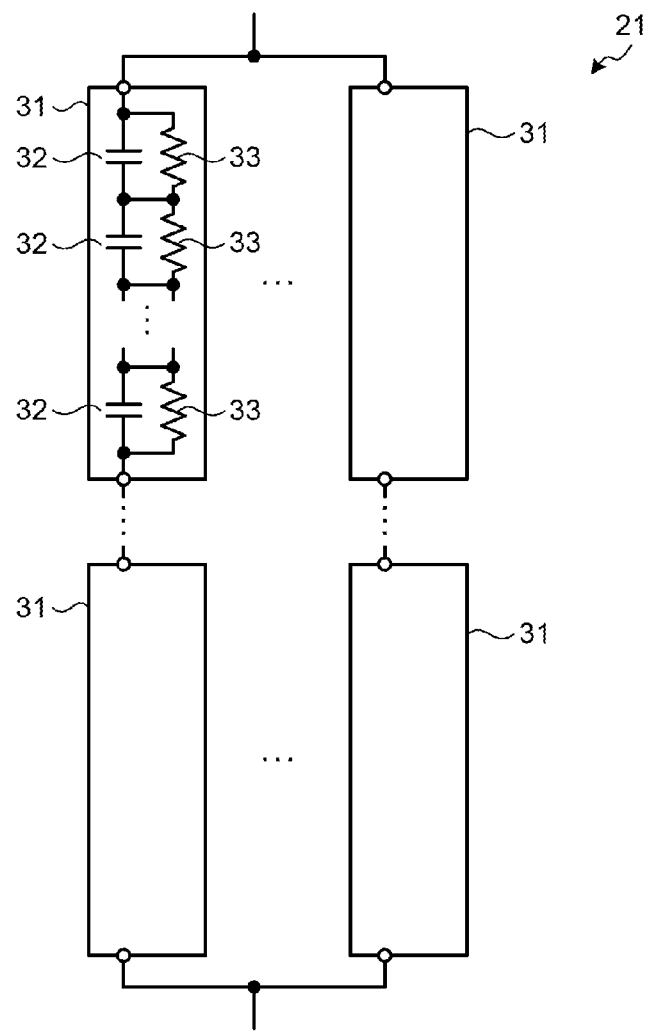
FIG. 4 is a block diagram of a configuration example of a power storage element shown in FIG. 3.

The power storage element 21 is constituted by a large-capacity electrolytic capacitor, an electric double layer capacitor (EDLC), or the like (see FIG. 4). The step-up/step-down bidirectional chopper circuit 22 can perform a bidirectional operation, that is, charge from the DC buses 2a and 2b to the power storage element 21 and discharge from the power storage element 21 to the DC buses 2a and 2b. In the first embodiment, a "circuit switching element 51" is provided in the step-up/step-down bidirectional chopper circuit 22 (see FIG. 5). The control circuit 23 controls the above bidirectional step-up/step-down operation of the step-up/step-down bidirectional chopper circuit 22 according to program control executed by a microcomputer. At this time, in the first embodiment, the control circuit 23 controls the "circuit switching element 51" provided in the step-up/step-down bidirectional chopper circuit 22.

FIG. 4 is a block diagram of a configuration example of the power storage element shown in FIG. 3. In FIG. 4, a case where the power storage element 21 is constituted by the electric double layer capacitor (EDLC) is shown. In FIG. 4, the power storage element 21 is used as an EDLC unit in which m×n (m and n are integers equal to or larger than 1) EDLC modules 31, 31, . . . are connected in series and in parallel. Each EDLC module 31 includes a plurality of EDLC cells 32, 32, . . . connected to each other in series, and voltage balance resistors 33, 33, . . . individually connected in parallel with the respective EDLC cells 31, 31, . . . in order to reduce variation in the voltage between the respective EDLC cells 31, 31, . . . .

An electrostatic capacity of the power storage element 21 configured in this manner is as large as, for example, about 1 farad. The electrostatic capacity of one EDLC cell 32 normally exceeds 100 farads; however, the highest voltage is approximately equal to or lower than 3 volts. Because the voltage between the DC buses 2a, 2b is normally 300 volts or 600 volts, the voltage of the power storage element 21 is practically equal to or larger than 150 volts. Although not shown in FIG. 4, the power storage element 21 may include a fuse and a breaker. The voltage balance resistor 33 can be omitted, or can be of another balancing system.

Figure 5:
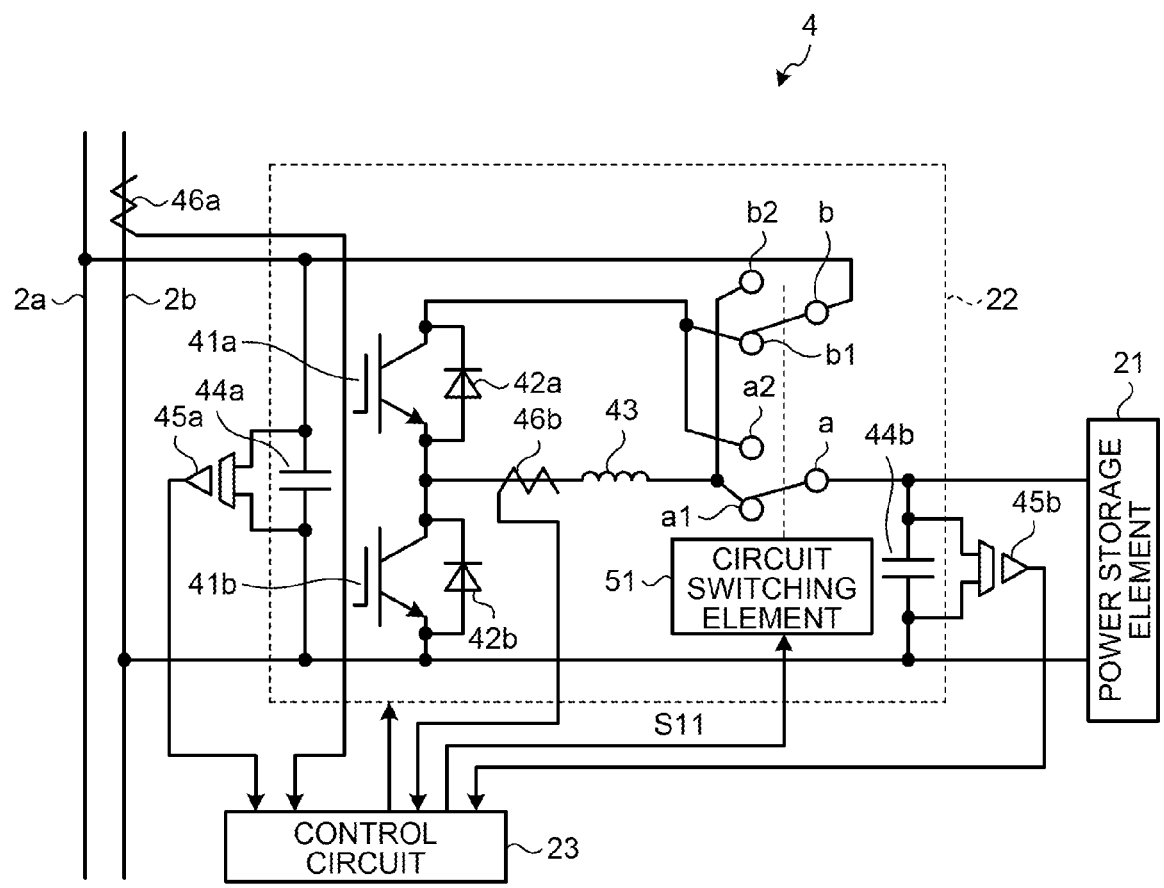
FIG. 5 is a circuit diagram of a specific configuration example of a step-up/step-down bidirectional chopper circuit shown in FIG. 3.

FIG. 5 is a circuit diagram of a specific configuration example of the step-up/step-down bidirectional chopper circuit shown in FIG. 3. Various circuit configurations are known for the step-up/step-down bidirectional chopper circuit 22. However, in the present embodiment, for example, as shown in FIG. 5, the simplest circuit configuration is used.

In FIG. 5, the step-up/step-down bidirectional chopper circuit 22 includes, as main constituent elements, two serially connected switching elements (for example, IGBT) 41a and 41b, a choke coil 43 with one end connected to a series connection terminal of the two switching elements 41a and 41b (a common connection terminal of an emitter terminal of the switching element 41a and a collector terminal of the switching element 41b in the example shown in FIG. 5), and the circuit switching circuit 51 according to the first embodiment. Reflux diodes 42a and 42b are connected in inverse parallel with the switching elements 41a and 41b, respectively.

A negative terminal, which is one end of a series circuit of the switching elements 41a and 41b (the emitter terminal of the switching element 41b in the example shown in FIG. 5), and a negative terminal of the power storage element 21 are connected commonly to the negative DC bus 2b. A smoothing capacitor 44a is connected to between the DC buses 2a and 2b. A smoothing capacitor 44b is connected to between a positive terminal and the negative terminal of the power storage element 21. There are cases where smoothing capacitors 44a and 44b are omitted.

The circuit switching element 51 according to the first embodiment has such a configuration that an encircled drive unit drives two pairs of switching circuits (a, a1, and a2) and (b, b1, and b2) in conjunction with each other. In one (a, a1, and a2) of the switching circuits, a switching base terminal a is connected to the positive terminal of the power storage element 21, a switching terminal a1 is connected to the other end of the choke coil 43, and a switching terminal a2 is connected the positive terminal, which is the other terminal of the series circuit of the switching elements 41a and 41b (the collector terminal of the switching element 41a in the example shown in FIG. 5). In the other switching circuit (b, b1, and b2), a switching base terminal b is connected to the positive DC bus 2a, a switching terminal b1 is connected to the collector terminal of the switching element 41a, and a switching terminal b2 is connected to the other end of the choke coil 43.

The voltage of the DC buses 2a and 2b detected by a voltage sensor 45a, the voltage of the power storage element 21 detected by a voltage sensor 45b, a bus current detected by a current sensor 46a, and a current flowing in the choke coil 43 detected by a current sensor 46b are input to the control circuit 23 as reference signals at the time of controlling the two switching elements 41a and 41b of the step-up/step-down bidirectional chopper circuit 22 and the circuit switching circuit 51. Detection values input to the control circuit 23 are not limited to the four values described above. These values are only examples, and other detection values can be input. The detection values can be input from a high-order controller (not shown).

The control circuit 23 generates a gate signal that causes the switching elements 41a and 41b to switch individually based on these detection values, thereby causing the step-up/step-down bidirectional chopper circuit 22 to perform an operation of charging the power storage element 21 by the regenerative power from the motor 5, and an operation of discharging the regenerative power accumulated in the power storage element 21 (power regeneration). At this time, the control circuit 23 controls the circuit switching element 51 according to the first embodiment, based on these detection values, to change a circuit configuration of the step-up/step-down bidirectional chopper circuit 22 to a first chopper circuit (FIG. 6) or to a second chopper circuit (FIG. 7).

Specifically, in the first chopper circuit (FIG. 6), the circuit switching element 51 connects the switching base terminal a and the switching terminal a1 of the one switching circuit (a, a1, and a2) thereby connecting the other end of the choke coil 43 to the positive terminal of the power storage element 21, and connects the switching base terminal b and the switching terminal b1 of the other switching circuit (b, b1, and b2)

thereby connecting the collector terminal of the switching element 41a to the positive DC bus 2a.

In the second chopper circuit (FIG. 7), the circuit switching element 51 connects the switching base terminal a and the switching terminal a2 of the one switching circuit (a, a1, and a2) thereby connecting the collector terminal of the switching element 41a to the positive terminal of the power storage element 21, and connects the switching base terminal b and the switching terminal b2 of the other switching circuit (b, b1, and b2) thereby connecting the other end of the choke coil 43 to the positive DC bus 2a.

Figure 6:
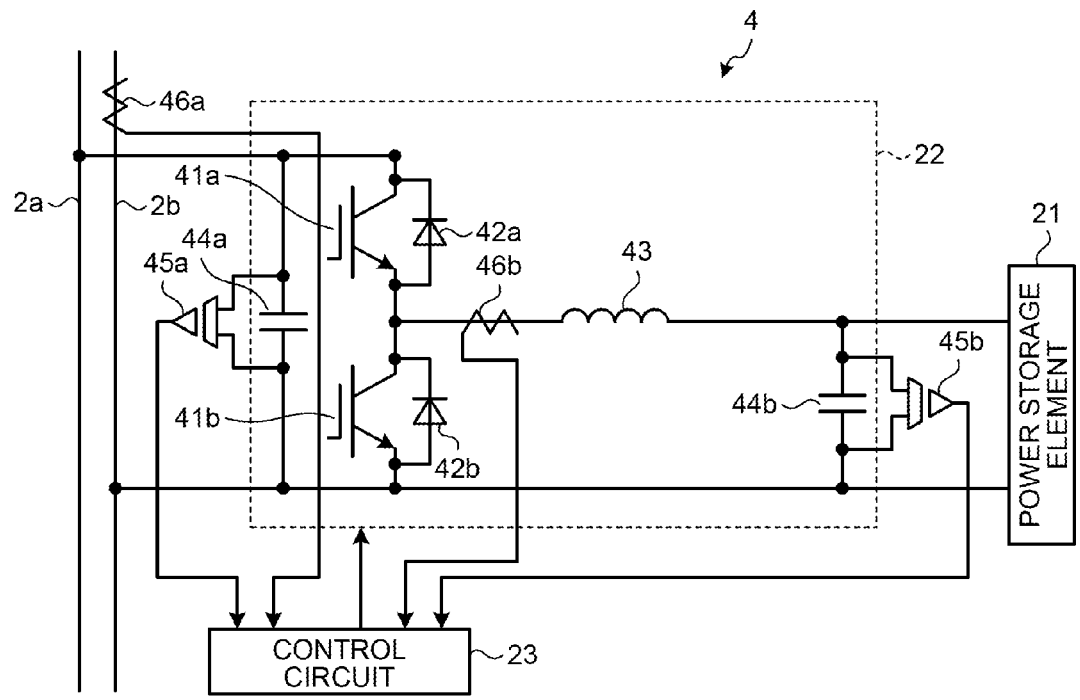
FIG. 6 is a circuit diagram of a first chopper circuit realized by a circuit switching element shown in FIG. 5.
Figure 7:
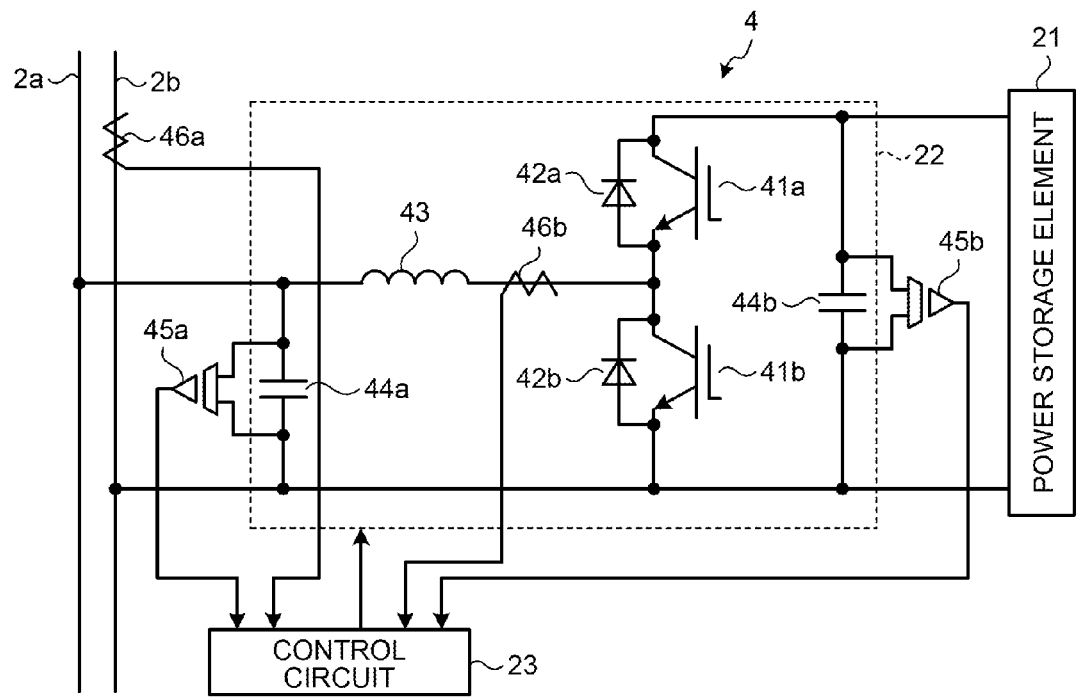
FIG. 7 is a circuit diagram of a second chopper circuit realized by the circuit switching element shown in FIG. 5.

The first chopper circuit shown in FIG. 6 can perform charge from the DC buses 2a and 2b to the power storage element 21 by stepping down the bus voltage, and can perform discharge from the power storage element 21 to the DC buses 2a and 2b by stepping up the voltage of the power storage element. On the other hand, the second chopper circuit shown in FIG. 7 can perform charge from the DC buses 2a and 2b to the power storage element 21 by stepping up the bus voltage, and can perform discharge from the power storage element 21 to the DC buses 2a and 2b by stepping down the voltage of the power storage element.

Figure 8:
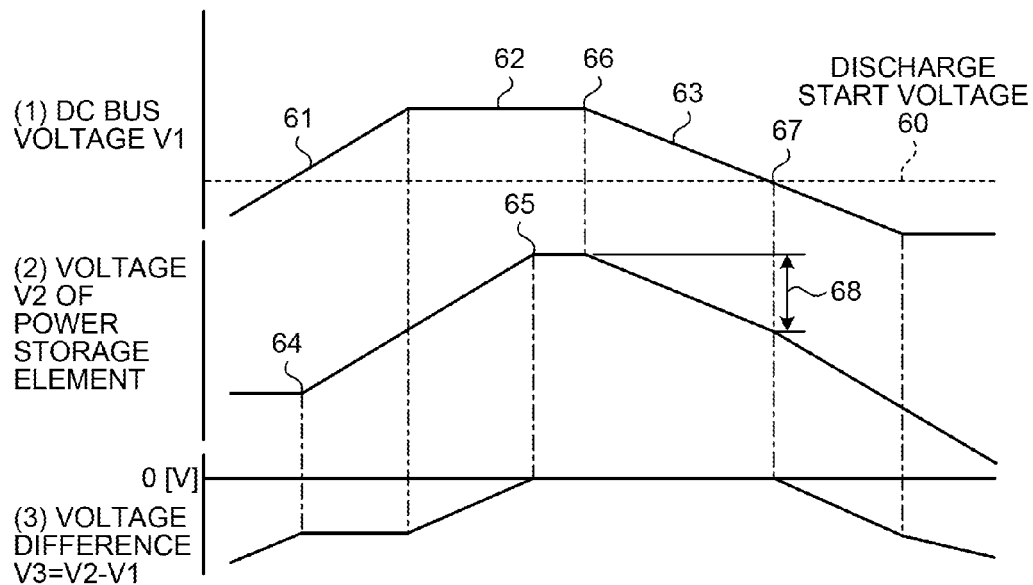
FIG. 8 is a characteristic diagram for explaining charge/discharge characteristics by the first chopper circuit shown in FIG. 6.
Figure 9:
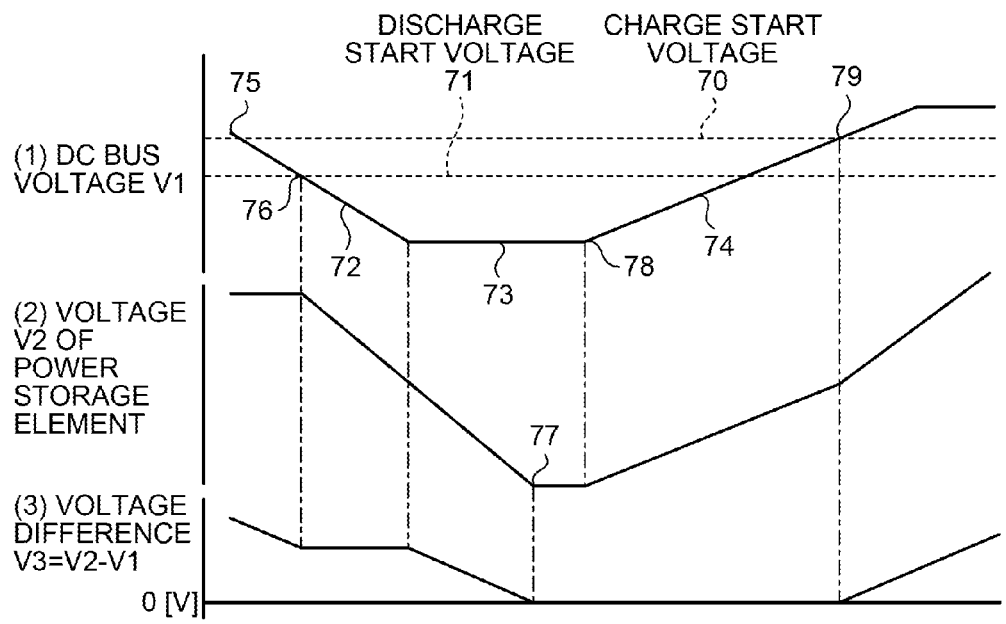
FIG. 9 is a characteristic diagram for explaining charge/discharge characteristics by the second chopper circuit shown in FIG. 7.

The first chopper circuit and the second chopper circuit are both generally used as the bidirectional chopper circuit in the power storage system 4. However, because the configuration thereof is such that the charge/discharge operation is affected by the bus voltage, an accumulation capacity (accumulated energy) of the power storage element 21 cannot be efficiently utilized conventionally. This issue is briefly explained with reference to FIGS. 8 and 9. FIG. 8 is a characteristic diagram for explaining charge/discharge characteristics by the first chopper circuit shown in FIG. 6. FIG. 9 is a characteristic diagram for explaining charge/discharge characteristics by the second chopper circuit shown in FIG. 7.

In FIG. 8, (1) a voltage change of the DC buses 2a and 2b, (2) a charge/discharge operation to and from the power storage element 21 with respect to the change, and (3) a voltage difference indicating the relation between a voltage V1 of the DC buses 2a and 2b and a voltage V2 of the power storage element 21 (V3=V2−V1) are shown. Furthermore, a discharge start voltage 60, which is an operation threshold of power regeneration, is set with respect to the voltage V1 of the DC buses 2a and 2b.

In (1) of FIG. 8, a period 61 in which the DC bus voltage V1 is rising corresponds to a deceleration period, a period 62 in which the constant voltage is maintained thereafter corresponds to a constant speed period, and a period 63 in which the DC bus voltage is dropping thereafter corresponds to an acceleration period.

In (2) of FIG. 8, in the power storage element 21, charge is started at a timing 64 in an initial stage of the period 61 in which the DC bus voltage is rising. The charge operation is performed until the voltage V2 of the power storage element 21 becomes equal to the DC bus voltage V1. In FIG. 6, a case where the voltage V2 of the power storage element 21 becomes equal to the DC bus voltage V1 at a timing 65 near the end of the period 62 in which the DC bus voltage V1 is constant.

In this case, the DC bus voltage V1 drops from the constant voltage at a timing 66 subsequent to the charge finish timing 65, and thus the state becomes V2>V1. Self-discharge from the power storage element 21 to the DC bus 2a then occurs through the reflux diode 42a. Therefore, the voltage V2 of the power storage element 21 also drops from the highest charge voltage. At this time, the control circuit 23 can recognize that the current is flowing to the choke coil 43 based on a notification from the current sensor 43b; however, the control circuit 23 cannot block the current. As a result, the current self-discharged to the DC bus 2a through the reflux diode 42a continues to flow up to a timing 67 at which the power storage element 21 and the DC bus 2 have the same voltage.

Power regeneration is started at the timing 67 at which the DC bus voltage V1 falls below the discharge start voltage 60. The voltage of the power storage element 21 at the timing 67 at the time of power regeneration is a voltage dropped from the highest charge voltage at the timing 66 by a voltage 68, and in the example shown in FIG. 8, it is about 60% of the highest charge voltage. The voltage 68 corresponds to an energy loss. That is, when the first chopper circuit is used, because the voltage of the power storage element 21 at the time of starting discharge is lower than the highest charge voltage, a discharge current flowing in the choke coil 43 increases by that amount, which becomes the energy loss, and causes a decrease in the use efficiency of the accumulated energy.

Next, in FIG. 9, although the relation of step-up and step-down is inverted, similarly to FIG. 8, (1) a voltage change of the DC buses 2a and 2b, (2) a charge/discharge operation to and from the power storage element 21 with respect to the change, and (3) a voltage difference indicating the relation between the voltage V1 of the DC buses 2a and 2b and the voltage V2 of the power storage element 21 (V3=V1−V2) are shown. Furthermore, a charge start voltage 70 and a discharge start voltage which is an operation threshold of power regeneration, are set with respect to the voltage V1 of the DC buses 2a and 2b. The charge start voltage 70 is higher than the discharge start voltage 71.

In (1) of FIG. 9, a period 72 in which the DC bus voltage is dropping corresponds to an acceleration period, a period 73 in which the constant voltage is maintained thereafter corresponds to a constant speed period, and a period 74 in which the DC bus voltage is rising thereafter corresponds to a deceleration period.

As can be understood from the configuration in FIG. 7, when the voltage V1 of the DC buses 2a and 2b is higher than the voltage V2 of the power storage element 21, charge (self-charge) to the power storage element 21 is performed through the reflux diode 42a. Such self-charge is performed at a timing 75 in FIG. 9. As a result, the bus voltage V1 drops and when the bus voltage V1 falls below the discharge start voltage 71 at a timing 76, discharge is started. The discharge operation is performed until the voltage V2 of the power storage element 21 becomes equal to the DC bus voltage V1. In FIG. 9, a case where the voltage V2 of the power storage element 21 becomes equal to the DC bus voltage V1 at a timing 77 near the end of the period 73 in which the DC bus voltage V1 is constant.

In this case, the DC bus voltage V1 rises from the constant voltage at a timing 78 subsequent to the discharge finish timing 77, and thus the state becomes V1>V2. Self-charge from the DC bus 2a to the power storage element 21 then occurs through the reflux diode 42a. Therefore, the voltage V2 of the power storage element 21 also rises. Original charge is started at a timing 79 at which the DC bus voltage V1 exceeds the charge start voltage 70. A period from the timing 77 to the timing 79 is a period in which the voltage difference V3 is zero. That is, when the second chopper circuit is used, because discharge from the power storage element 21 can only be performed until the voltage of the power storage element 21 becomes equal to the bus voltage, the use efficiency of the accumulated energy usable due to power regeneration is not good.

How to increase the energy use efficiency at the time of power regeneration is examined here. When the voltage before discharge of the power storage element 21 is designated as Va, and the voltage after discharge thereof is designated as Vb, usable power P thereof becomes P=(Va²−Vb²)/2. To increase the use efficiency of the energy accumulated in the power storage element 21, it is required to set and control the voltage before discharge Va as high as possible, and the voltage after discharge Vb as low as possible.

As shown in FIGS. 8 and 9, when the first chopper circuit or the second chopper circuit is used separately, either the charge operation or the discharge operation is affected by the bus voltage. Therefore, the voltage of the power storage element 21 cannot be controlled so as to satisfy the requirement mentioned above. However, the first and second chopper circuits have complementary step-up and step-down characteristics that complement each other's defects. Therefore, in the first embodiment, the circuit switching circuit 51 is provided with the step-up/step-down bidirectional chopper circuit 22, and a charge/discharge control circuit shown in FIG. 1 is provided with the control circuit 23, so that the first chopper circuit and the second chopper circuit are combined and used at the time of charge and discharge as described below.

Figure 10:
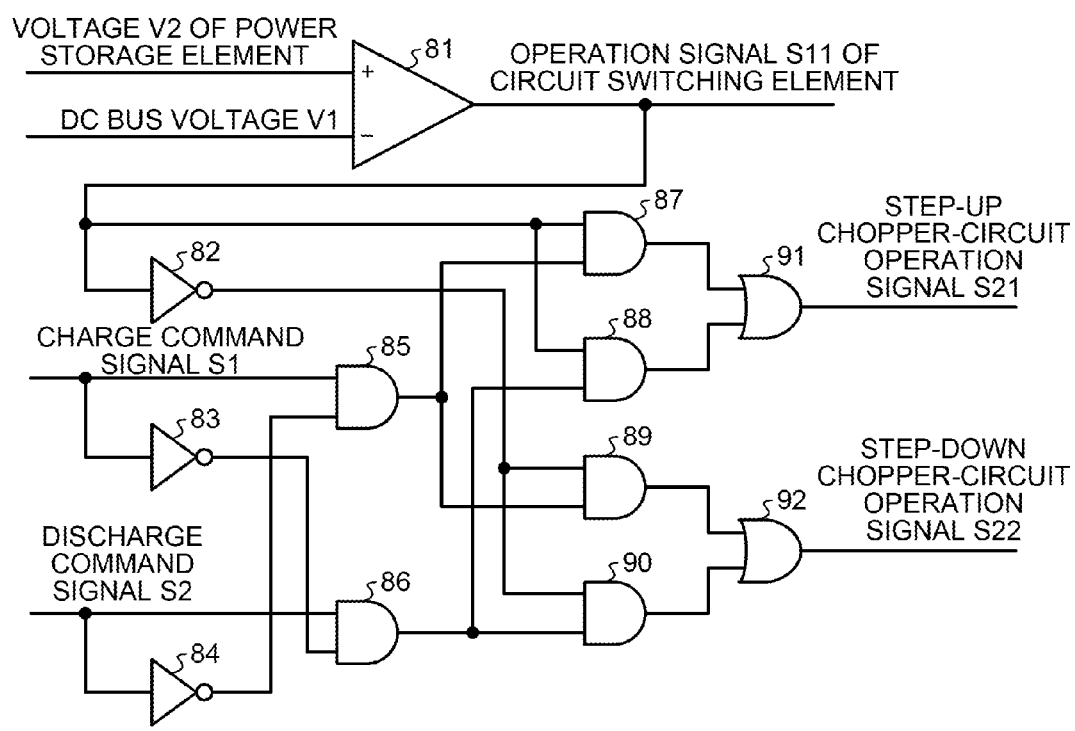
FIG. 10 is a circuit diagram of an example of a charge/discharge control circuit included in a control circuit shown in FIG. 3.

In FIG. 10, the charge/discharge control circuit can include a comparator 81, logic inversion circuits 82, 83, and 84, AND circuits 85 to 90, and OR circuits 91 and 92. In the comparator 81, the voltage V2 of the power storage element 21 is input to a non-inverting input terminal (+), and the DC bus voltage V1 is input to an inverting input terminal (−) to output a circuit-switchover request signal S11, which is a comparison operation result.

In this configuration, an output of the comparator 81 (the circuit-switchover request signal S11) becomes a low level (hereinafter, "L" level) in the case of V1>V2, and becomes a high level (hereinafter, "H" level) in the case of V1<V2. The circuit-switchover request signal S11 is input to the circuit switching element 51, and becomes one of the inputs of the AND circuits 87 and 88, and one of the inputs of the AND circuits 89 and 90 through the logic inversion circuit 82.

In the comparison operation of the comparator 81, in a case of shifting from V1>V2 to V1<V2 and in a case of shifting inversely, the output level can be switched immediately at a timing of V1=V2. However, a certain dead zone can be provided, and the output level can be switched with a delay of a certain time, without switching the circuit only by the occurrence of the state of V1=V2 for a short time. When the output level is switched with a delay of the certain time, duration can be made different such as t1 and t2, in the case of shifting from V1>V2 to V1<V2 and in the case of shifting inversely (see FIGS. 11 and 12).

In the first embodiment, the circuit switching element 51 forms the first chopper circuit (FIG. 6) when the circuit-switchover request signal S11 is at the "L" level, and forms the second chopper circuit (FIG. 7) when the circuit-switchover request signal S11 is at the "H" level.

A charge command signal S1 is generated when the DC bus voltage V1 exceeds the preset charge start voltage. Furthermore, a discharge command signal S2 is generated when the DC bus voltage V1 falls below the preset discharge start voltage.

One of the inputs of the AND circuit 85 is the charge command signal S1, and the other input is the discharge command signal S2 through the logic inversion circuit 84. The output of the AND circuit 85 becomes the other inputs of the AND circuits 87 and 89.

One of the inputs of the AND circuit 86 is the discharge command signal S2, and the other input is the charge command signal S1 through the logic inversion circuit 83. The output of the AND circuit 86 becomes the other inputs of the AND circuits 88 and 90.

The OR circuit 91 receives the outputs of the AND circuits 87 and 88 as an input, and outputs a step-up chopper-circuit operation signal S21. The "step-up chopper circuit" here is the first chopper circuit at the time of discharge and the second chopper circuit at the time of charge. The OR circuit 92 receives the outputs of the AND circuits 89 and 90 as an input, and outputs a step-down chopper-circuit operation signal S22. The "step-down chopper circuit" here is the second chopper circuit at the time of discharge and the first chopper circuit at the time of charge. Drive signals are generated so that the two switching elements 41a and 41b can perform the switching operation in a complementary style, based on the outputs of the OR circuits 91 and 92, and applied to the corresponding gate terminals of the switching elements 41a and 41b.

In the first embodiment, (1) when a device is powered on, the control circuit 23 executes control to charge the power storage element 21 up to a preset initial charge voltage, (2) at the time of driving the AC motor 5 thereafter, controls charge/discharge between the power storage element 21 and the DC buses 2a and 2b, and (3) when the device is powered off to finish driving of the device, controls discharge from the power storage element 21 to the DC buses 2a and 2b up to a preset discharge limit voltage. A step of (1) is for fully utilizing the capacity of the power storage element 21. A step of (3) is a safety measure when the device is powered off to replace the power storage element 21 or the like.

The charge/discharge control operation of (1), (2), and (3) is explained with reference to FIG. 10. However, (1) and (3) are picked up by separating (2), and may or may not have relevance with (2). The charge/discharge control operation is explained here, assuming that there is no operational relevance between (2) and (1) and (3).

(1) Charge Control at the Time of Power-on

At the time of power-on, the charge command signal S1 is at the "H" level, and the discharge command signal S2 is at the "L" level. Accordingly, the output of the AND circuit 85 is at the "H" level, and the output of the AND circuit 86 is at the "L" level. Because the DC bus voltage V1 is higher than the voltage V2 of the power storage element 21, the circuit-switchover request signal S11 output by the comparator 81 is at the "L" level. The step-up/step-down bidirectional chopper circuit 22 forms the first chopper circuit (FIG. 6). The output of the AND circuit 89 becomes the "H" level, and the step-down chopper-circuit operation signal S22 is output from the OR circuit 92. The first chopper circuit (FIG. 6) charges the power storage element 21, while stepping down the DC bus voltage V1.

When charge to the power storage element 21 makes progress and the voltage V2 of the power storage element 21 becomes equal to the DC bus voltage V1, the comparator 81 switches the circuit-switchover request signal S11 from the "L" level to the "H" level. The step-up/step-down bidirectional chopper circuit 22 is then switched to the second chopper circuit (FIG. 7). The output of the AND circuit 87 becomes the "H" level, and the step-up chopper-circuit operation signal S21 is output from the OR circuit 91. The second chopper circuit (FIG. 7) continues to charge the power storage element 21 until the voltage V2 of the power storage element 21 becomes equal to the initial charge voltage, while stepping up the DC bus voltage V1. In the second chopper circuit (FIG. 7), the switching elements 41a and 41b stop the operation in a state with the voltage V2 of the power storage element 21 being higher than the DC bus voltage V1. However, because a discharge path from the power storage element 21 to the DC buses 2a and 2b is not formed, the voltage V2 of the power storage element 21 is held at the initial charge voltage higher than the DC bus voltage V1.

(2-1) Charge Control at the Time of Driving the AC Motor

In the case where the charge command signal S1 becomes the "H" level and the discharge command signal S2 becomes the "L" level because the DC bus voltage V1 that changes depending on the operation state of the AC motor has exceeded the charge start voltage, when the comparator 81 sets the circuit-switchover request signal S11 to the "L" level, the step-up/step-down bidirectional chopper circuit 22 forms the first chopper circuit (FIG. 6). The output of the AND circuit 89 becomes the "H" level, and the step-down chopper-circuit operation signal S22 is output from the OR circuit 92. The first chopper circuit (FIG. 6) charges the power storage element 21, while stepping down the DC bus voltage V1.

When charge to the power storage element 21 makes progress and the voltage V2 of the power storage element 21 becomes equal to the DC bus voltage V1, the comparator 81 switches the circuit-switchover request signal S11 from the "L" level to the "H" level. The step-up/step-down bidirectional chopper circuit 22 is then switched to the second chopper circuit (FIG. 7). The output of the AND circuit 87 becomes the "H" level, and the step-up chopper-circuit operation signal S21 is output from the OR circuit 91. The second chopper circuit (FIG. 7) continues to charge the power storage element 21, while stepping up the DC bus voltage V1. In the second chopper circuit (FIG. 7), the switching elements 41a and 41b stop the operation in the state with the voltage V2 of the power storage element 21 being higher than the DC bus voltage V1. However, because the discharge path from the power storage element 21 to the DC buses 2a and 2b is not formed, the voltage V2 of the power storage element 21 is held at the voltage higher than the DC bus voltage V1. That is, the discharge start voltage can be maintained at the highest charge voltage, which is higher than the DC bus voltage V1. Therefore, because a discharge current flowing to the choke coil 43 drops at the time of discharge, power losses can be reduced.

(2-2) Discharge Control at the Time of Driving the AC Motor

In a state where the comparator 81 sets the circuit-switchover request signal S11 to the "H" level and the step-up/step-down bidirectional chopper circuit 22 forms the second chopper circuit (FIG. 7), when the DC bus voltage V1 that changes depending on the operation state of the AC motor falls below the discharge start voltage, the discharge command signal S2 becomes the "H" level, and the charge command signal S1 becomes the "L" level. In this case, the output of the AND circuit 88 becomes the "H" level, and the step-up chopper-circuit operation signal S21 is output from the OR circuit 91. The second chopper circuit (FIG. 7) performs discharge to the DC buses 2a and 2b, while stepping down the voltage V2 of the power storage element 21.

When discharge to the DC buses 2a and 2b makes progress and the voltage V2 of the power storage element 21 becomes equal to the DC bus voltage V1, the comparator 81 switches the circuit-switchover request signal S11 from the "H" level to the "L" level. The step-up/step-down bidirectional chopper circuit 22 is then switched to the first chopper circuit (FIG. 6). The output of the AND circuit 90 becomes the "H" level, and the step-down chopper-circuit operation signal S22 is output from the OR circuit 92. The first chopper circuit (FIG. 6) continues discharge to the DC buses 2a and 2b, while stepping down the voltage V2 of the power storage element 21. That is, because discharge is performed so that the voltage V2 of the power storage element 21 becomes equal to or lower than the voltage V1 of the DC buses 2a and 2b, the use efficiency of the energy accumulated in the power storage element 21 can be improved.

(3) Discharge Control at the Time of Finishing the Device Operation

When the device operation is finished by power-off of the device, the discharge command signal S2 becomes the "H" level, and the charge command signal S1 becomes the "L" level. When the comparator 81 sets the circuit-switchover request signal S11 to the "H" level, the step-up/step-down bidirectional chopper circuit 22 forms the second chopper circuit (FIG. 7), the output of the AND circuit 88 becomes the "H" level, and the step-up chopper-circuit operation signal S21 is output from the OR circuit 91. The second chopper circuit (FIG. 7) performs discharge to the DC buses 2a and 2b, while stepping down the voltage V2 of the power storage element 21.

When discharge to the DC buses 2a and 2b makes progress and the voltage V2 of the power storage element 21 becomes equal to the DC bus voltage V1, the comparator 81 switches the circuit-switchover request signal S11 from the "H" level to the "L" level. The step-up/step-down bidirectional chopper circuit 22 is then switched to the first chopper circuit (FIG. 6). The output of the AND circuit 90 becomes the "H" level, and the step-down chopper-circuit operation signal S22 is output from the OR circuit 92. The first chopper circuit (FIG. 6) continues discharge to the DC buses 2a and 2b, while stepping down the voltage V2 of the power storage element 21 up to the discharge limit voltage, which is equal to or lower than the DC bus voltage V1.

Figure 11:
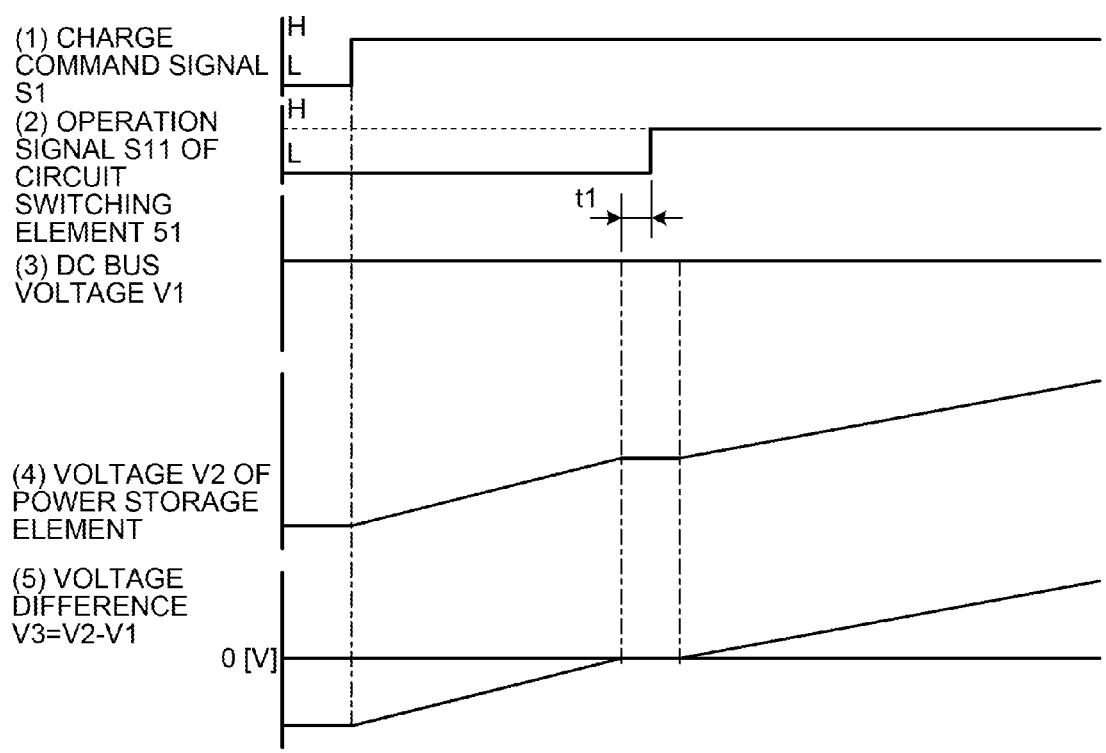
FIG. 11 is a waveform diagram of relevant parts for explaining a charge operation according to the first embodiment.
Figure 12:
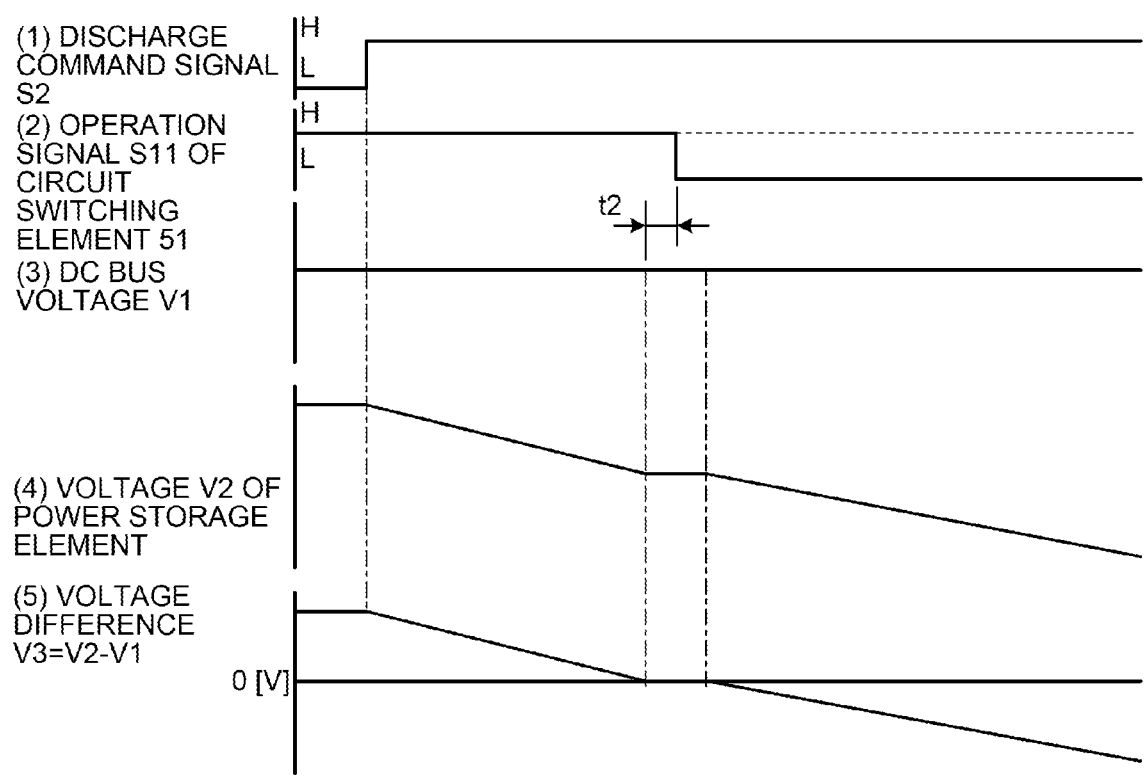
FIG. 12 is a waveform diagram of relevant parts for explaining a discharge operation according to the first embodiment.

FIG. 11 is a waveform diagram of relevant parts for explaining a charge operation according to the first embodiment. FIG. 12 is a waveform diagram of relevant parts for explaining a discharge operation according to the first embodiment. FIGS. 11 and 12 collectively depict the charge operation and the discharge operation described above.

As shown in FIG. 11, the voltage V2 of the power storage element 21 can be increased exceeding the voltage V1 of the DC buses 2a and 2b, regardless of the voltage V1 of the DC buses 2a and 2b, and charge can be performed up to a chargeable highest voltage (an initial charge voltage) of the power storage element 21.

As shown in FIG. 12, because the voltage V2 of the power storage element 21 at the time of starting discharge is higher than the voltage V1 of the DC buses 2a and 2b, an energy amount from the power storage element 21 that can be reused can be increased. Furthermore, the discharge current flowing in the choke coil 43 decreases and power losses can be reduced. Discharge can be also performed up to a dischargeable lowest voltage (a discharge limit voltage) of the power storage element 21, which falls below the voltage V1 of the DC buses 2a and 2b, regardless of the voltage V1 of the DC buses 2a and 2b.

As described above, according to the first embodiment, there is provided a circuit switching element that can switch the configuration of the step-up/step-down bidirectional chopper circuit, which includes, as main constituent elements, a series circuit that is constituted by two switching elements and a choke coil, with one end thereof connected to a series connection terminal of the two switching elements, to a first chopper circuit in which the positive terminal of the series circuit of the two switching elements is connected to the DC bus and the other end of the choke coil is connected to the positive terminal of the power storage element, or to a second chopper circuit in which the positive terminal of the series circuit of the two switching elements is connected to the positive terminal of the power storage element and the other end of the choke coil is connected to the DC bus. At the time of charge and discharge, the first chopper circuit and the second chopper circuit are switched and used near the timing at which a magnitude relation between the DC bus voltage and the voltage of the power storage element is changed. Accordingly, at the time of charge, the power storage element can be charged up to a high voltage exceeding the DC bus voltage (the chargeable highest voltage) without being affected by the DC bus voltage. At the time of discharge, discharge can be performed from the power storage element up to a low voltage that falls below the DC bus voltage (the dischargeable lowest voltage).

Accordingly, at the time of charge, largest energy that can be accumulated in the power storage element can be accumulated, and the energy accumulated in the power storage element can be used effectively to the full extent at the time of discharge, thereby enabling to realize an AC motor drive device having mounted therein the power storage system that can improve the energy use efficiency.

Second Embodiment

Figure 13:
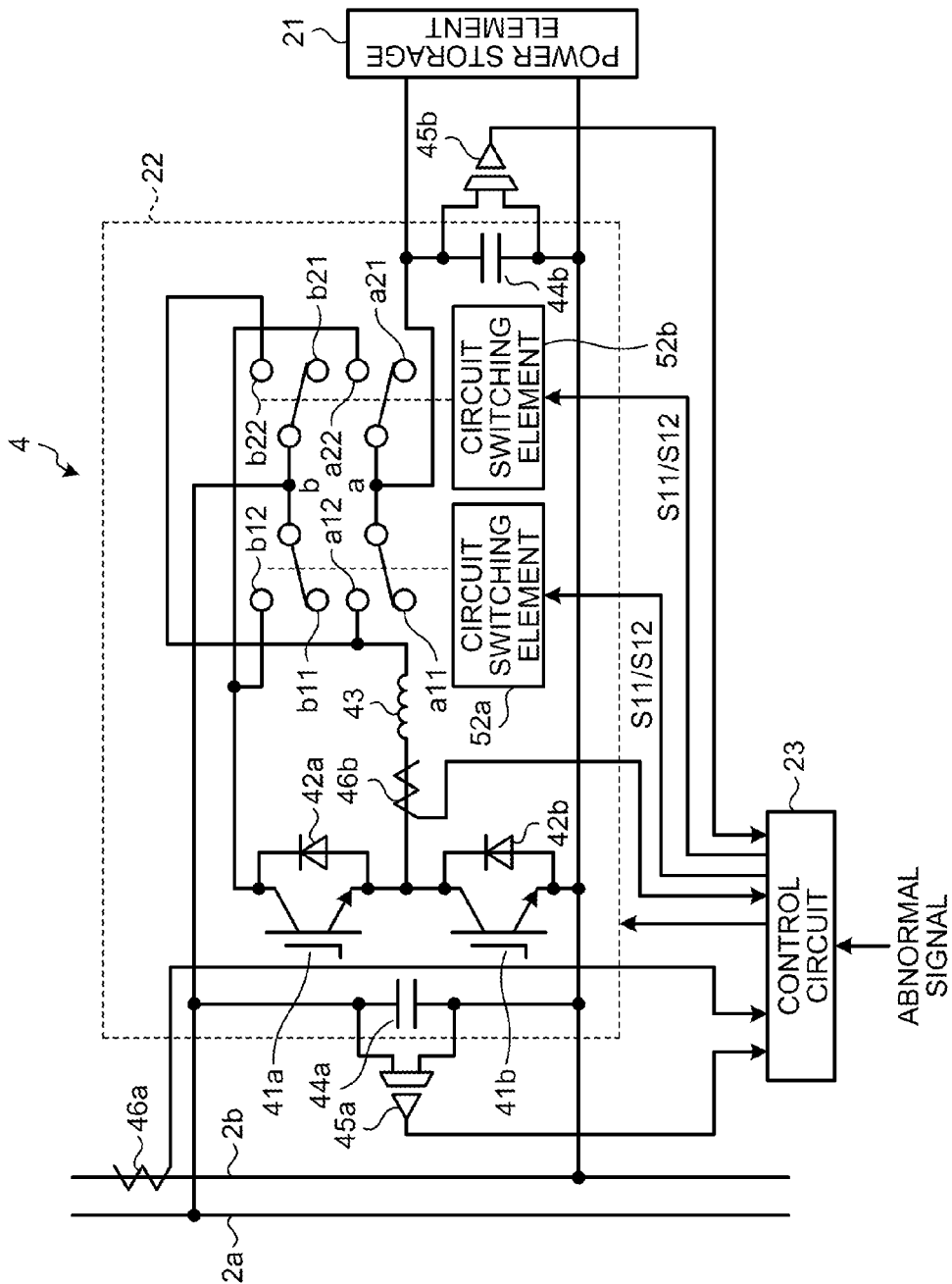
FIG. 13 is a circuit diagram of a configuration example of a power storage system as a second embodiment of the present invention that can handle occurrence of an abnormality.

FIG. 13 is a circuit diagram of a configuration example of a power storage system according to a second embodiment of the present invention that can handle occurrence of an abnormality. In FIG. 13, constituent elements identical or equivalent to those shown in FIG. 5 (the first embodiment) are denoted by like reference signs. Elements related to the second embodiment are mainly explained below.

In FIG. 13, a power storage system 4 according to the second embodiment includes two circuit switching elements 52a and 52b, instead of the circuit switching element 51 in the configuration shown in FIG. 5 (the first embodiment). An abnormal signal is input to the control circuit 23 from inside of a device or from outside of the device.

The abnormal signal input from inside of the device indicates occurrence of a defect that decreases the voltage of the DC buses 2a and 2b or a defect that short-circuits between the DC buses 2a and 2b in the DC power source 1 or the inverter 3. The abnormal signal input from outside of the device is input when shutdown of the device is required.

The circuit switching elements 52a and 52b include switching circuits (a, a11, and a12) and (a, a21, a22) that share a switching base terminal a connected to a positive terminal of the power storage element 21, and switching circuits (b, b11, and b12) and (b, b21, b22) that share a switching base terminal b connected to the positive DC bus 2a, although drive units thereof are separately independent.

In the switching circuits (a, a11, and a12) (b, b11, and b12) of the circuit switching element 52a, the switching terminal a12 is connected to the other end of the choke coil 43, and the switching terminal b12 is connected a collector terminal of the switching element 41a. However, the switching terminals a11 and b11 are not connected to anywhere. Accordingly, the circuit switching element 52a can perform an operation of forming the first chopper circuit by connecting the switching terminal a12 to the switching base terminal a and connecting the switching terminal b12 to the switching base terminal b, and an operation of opening/blocking between the DC buses 2a and 2b and the step-up/step-down bidirectional chopper circuit 22 and between the step-up/step-down bidirectional chopper circuit 22 and the power storage element 21, by connecting the switching terminal a11 to the switching base terminal a and connecting the switching terminal b11 to the switching base terminal b.

In the switching circuits (a, a21, and a22) (b, b21, and b22) of the circuit switching element 52b, the switching terminal a22 is connected to the collector terminal of the switching element 41a, and the switching terminal b22 is connected to the other end of the choke coil 43. However, the switching terminals a21 and b21 are not connected to anywhere. Accordingly, the circuit switching element 52b can perform an operation of forming the second chopper circuit by connecting the switching terminal a22 to the switching base terminal a and connecting the switching terminal b22 to the switching base terminal b, and an operation of opening/blocking between the DC buses 2a and 2b and the step-up/step-down bidirectional chopper circuit 22 and between the step-up/step-down bidirectional chopper circuit 22 and the power storage element 21, by connecting the switching terminal a21 to the switching base terminal a and connecting the switching terminal b21 to the switching base terminal b.

When the device is in a sound and normal operation state, the control circuit 23 outputs the circuit-switchover request signal S11 explained in the first embodiment to the circuit switching elements 52a and 52b in a predetermined order depending on whether it is at the time of charge or discharge. When the abnormal signal is input in the normal operation state described above, the control circuit 23 outputs a circuit-disconnection request signal S12 to the circuit switching element of the circuit switching elements 52a and 52b, which has been performing circuit switchover, to open/block between the DC buses 2a and 2b and the step-up/step-down bidirectional chopper circuit 22 and between the step-up/step-down bidirectional chopper circuit 22 and the power storage element 21.

Therefore, the energy accumulated in the power storage element 21 can be held until an abnormality is eliminated, without decreasing the energy. Accordingly, the energy accumulated in the power storage element 21 can be used effectively to the full extent.

For example, when the step-up/step-down bidirectional chopper circuit 22 forms the first chopper circuit and is operating, if any abnormality occurs in the DC power source 1 or the inverter 3 to decrease the voltage of the DC buses 2a and 2b, discharge to a side of the DC bus 2a occurs through the reflux diode 42a. This discharge is self-discharge that cannot be controlled by the control circuit 23. Because the discharge current at this time is a large current, if it is left as it is, there are harmful influences to the peripheral circuits such that a device present in the current path is damaged and a defective part in the DC power source 1 or the inverter 3 is extended. Such harmful influences can be prevented.

Therefore, in FIG. 13, a case of opening/blocking between the DC buses 2a and 2b and the step-up/step-down bidirectional chopper circuit 22 and between the step-up/step-down bidirectional chopper circuit 22 and the power storage element 21 is shown as a configuration of opening/blocking at the time of occurrence of an abnormality. However, at least between the step-up/step-down bidirectional chopper circuit 22 and the power storage element 21 only needs to be opened and blocked.

According to the second embodiment, because the power storage element 21 is detached from other devices including the step-up/step-down bidirectional chopper circuit 22, an AC motor drive device having mounted therein a highly safe power storage system that prevents breakage influence such that the power storage element 21 causes breakage or damage in other devices can be realized. In addition, an AC motor drive device having mounted therein a power storage system that can use the energy accumulated in the power storage element 21 effectively to the full extent can be realized.

Third Embodiment

Figure 14:
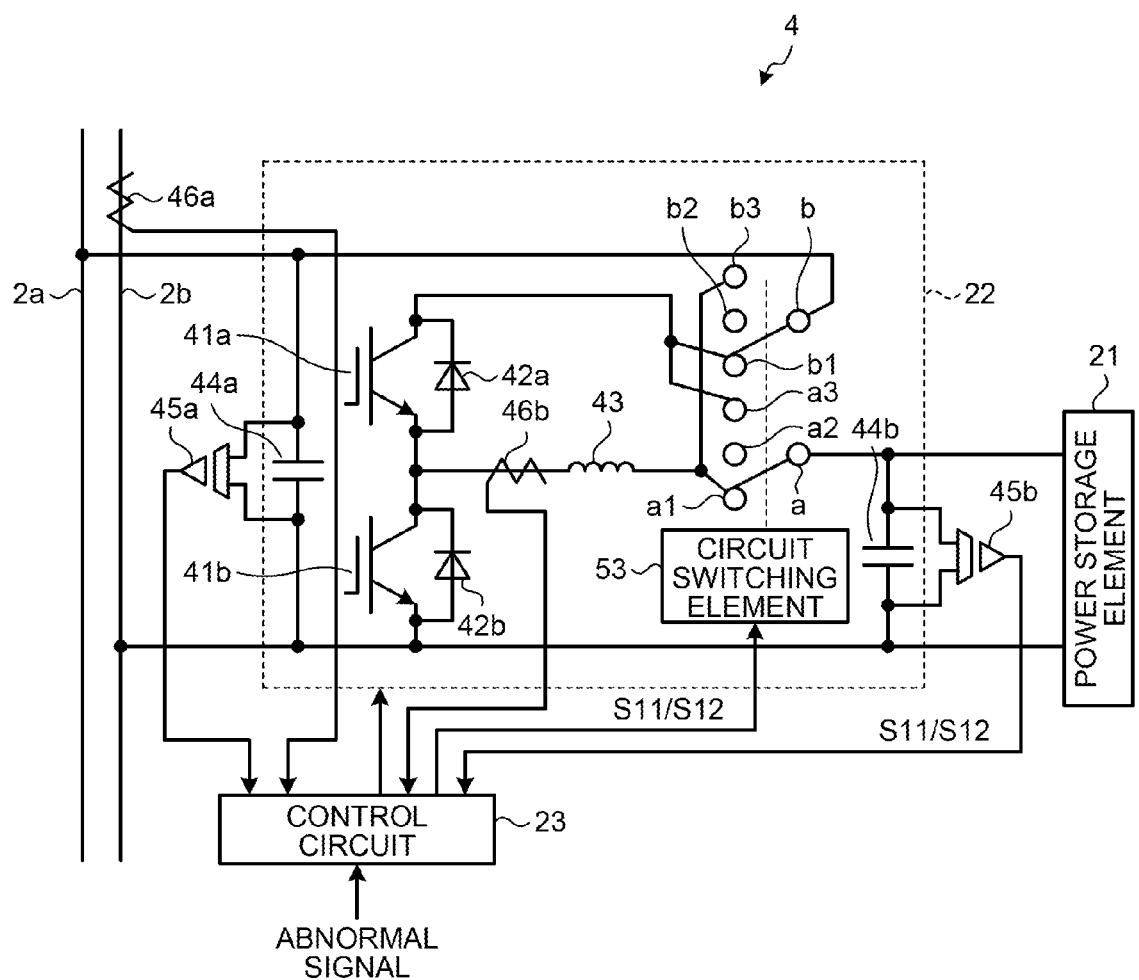
FIG. 14 is a circuit diagram of another configuration example of a power storage system as a third embodiment of the present invention that can handle occurrence of an abnormality.

FIG. 14 is a circuit diagram of another configuration example of a power storage system as a third embodiment of the present invention that can handle occurrence of an abnormality. In FIG. 14, constituent elements identical or equivalent to those shown in FIG. 13 (the second embodiment) are denoted by like reference signs. Elements related to the fourth embodiment are mainly explained below.

In FIG. 14, in the power storage system 4 according to the third embodiment, in the configuration shown in FIG. 13 (the second embodiment), the abnormal signal explained in the second embodiment is input to the control circuit 23 from inside of a device or outside of the device, and a circuit switching element 53 is provided instead of the circuit switching elements 52a and 52b.

The circuit switching element 53 has such a configuration that the encircled drive unit drives two pairs of switching circuits (a, a1, a2, and a3) and (b, b1, b2, and b3) in conjunction with each other. In one (a, a1, a2, and a3) of the switching circuits, a switching base terminal a is connected to a positive terminal of the power storage element 21, a switching terminal a1 is connected to the other end of the choke coil 43, a switching terminal a2 is not connected to anywhere, and a switching terminal a3 is connected a collector terminal of the switching element 41a. In the other switching circuit (b, b1, b2, and b3), a switching base terminal b is connected to the positive DC bus 2a, a switching terminal b1 is connected to the collector terminal of the switching element 41a, a switching terminal b2 is not connected to anywhere, and a switching terminal b3 is connected to the other end of the choke coil 43.

Accordingly, the circuit switching element 53 can perform an operation of forming the first chopper circuit by connecting the switching terminal a1 to the switching base terminal a and connecting the switching terminal b1 to the switching base terminal b, an operation of forming the second chopper circuit by connecting the switching terminal a3 to the switching base terminal a and connecting the switching terminal b3 to the switching base terminal b, an operation of opening/blocking between the DC buses 2a and 2b and the power storage element 21 by connecting the switching terminal a2 to the switching base terminal a and connecting the switching terminal b to the switching base terminal b.

When the device is in a sound and normal operation state, the control circuit 23 outputs the circuit-switchover request signal S11 explained in the first embodiment to the circuit switching element 53. When the abnormal signal is input in the normal operation state described above, the control circuit 23 outputs a circuit-disconnection request signal S12 to the circuit switching element 53 to open/block between the DC buses 2a and 2b and the power storage element 21.

Similarly to the second embodiment, in FIG. 14, a case of opening/blocking between the DC buses 2a and 2b and the step-up/step-down bidirectional chopper circuit 22 and between the step-up/step-down bidirectional chopper circuit 22 and the power storage element 21 is shown as an opening/blocking configuration at the time of occurrence of an abnormality. However, at least between the step-up/step-down bidirectional chopper circuit 22 and the power storage element 21 only needs to be opened and blocked.

Accordingly, also in the third embodiment, similarly to the second embodiment, because the power storage element 21 can be detached from other devices including the step-up/step-down bidirectional chopper circuit 22, an AC motor drive device having mounted therein a highly safe power storage system that prevents breakage influence such that the power storage element 21 causes breakage or damage in other devices when the power storage element 21 is connected can be realized. In addition, an AC motor drive device having mounted therein a power storage system that can use the energy accumulated in the power storage element 21 effectively to the full extent can be realized, similarly to the second embodiment.

INDUSTRIAL APPLICABILITY

As described above, the AC motor drive device according to the present invention is useful as an AC motor drive device having mounted therein a power storage system that can perform charge and discharge to and from a power storage element regardless of bus voltages and can improve energy use efficiency, without providing two switching circuits in a bidirectional step-up/step-down chopper circuit used in a power storage system.

REFERENCE SIGNS LIST

1 DC power source
2a, 2b DC bus
3 inverter
4 power storage system
5 AC motor
21 power storage element
22 step-up/step-down bidirectional chopper circuit
23 control circuit
31 EDLC (electric double layer capacitor) module
32 EDLC cell
33 voltage balance resistor
41a, 41b switching element
42a, 42b reflux diode
43 choke coil
44a, 44b smoothing capacitor
45a, 45b voltage sensor
46a, 46b current sensor
51, 52a, 52b, 53 circuit switching element
81 comparator
82 to 84 logic inversion circuit
85 to 90 AND circuit
91, 92 OR circuit

The invention claimed is:
1. An AC motor drive device comprising:
a DC bus connected to a DC power supply;
an inverter that converts DC power supplied from the DC bus to AC power required for driving an AC motor; and
a power storage system that is connected to the DC bus in parallel with the inverter for controlling DC power of the DC bus,
wherein the power storage system comprises:
a power storage element that can store DC power;
a step-up/step-down bidirectional chopper circuit that includes two switching elements in series and a choke coil whose one end is connected to a serially connected terminal of the two switching elements, and is arranged between the DC bus and the power storage element to perform a charge operation from the DC bus to the power storage element and a discharge operation from the power storage element to the DC bus; and
a control circuit that executes control so that an operation of the step-up/step-down bidirectional chopper circuit is switched to a first operation as a first chopper circuit in which a positive terminal of one of the switching elements is connected to a positive side of the DC bus and the other end of the choke coil is connected to a positive terminal of the power storage element, or to a second operation as a second chopper circuit in which the other end of the choke coil is connected to the positive terminal of the DC bus and the positive terminal of the one switching element is connected to the positive terminal of the power storage element, wherein the control circuit compares a voltage of the DC bus with a voltage of the power storage element, and before and after a timing at which a result of the comparison is changed, switches and executes the first operation and the second operation in a predetermined order, thereby realizing the charge operation and the discharge operation, respectively.

2. The AC motor drive device according to claim 1, wherein the power storage system further includes a circuit switching element that switches the configuration of the step-up/step-down bidirectional chopper circuit to the first chopper circuit or to the second chopper circuit, and wherein the control circuit compares the voltage of the DC bus with the voltage of the power storage element, and before and after a timing at which the result of the comparison is changed, causes the circuit switching element to switch a corresponding circuit of the first chopper circuit and the second chopper circuit to constitute the first chopper circuit or the second chopper circuit, to operate the first chopper circuit and the second chopper circuit in a predetermined order, thereby realizing the charge operation and the discharge operation, respectively.

3. The AC motor drive device according to claim 2, wherein the control circuit compares the voltage of the DC bus with the voltage of the power storage element at a time of driving the AC motor, and when the voltage of the DC bus becomes higher than the voltage of the power storage element and a charge command is generated, causes the circuit switching element to constitute the first chopper circuit so as to perform the charge operation to the power storage element, while stepping down the voltage of the DC bus; and near a timing at which the voltage of the power storage element rises and the magnitude relation with the voltage of the DC bus is changed, causes the circuit switching element to constitute the second chopper circuit so as to perform the charge operation to the power storage element, while stepping up the voltage of the DC bus.

4. The AC motor drive device according to claim 3, wherein in a case where the circuit switching element constitutes the second chopper circuit, when a discharge command is generated, the control circuit causes the constituted second chopper circuit to perform a discharge operation to the DC bus, while stepping down the voltage of the power storage element; and near a timing at which the voltage of the power storage element drops and the magnitude relation with the voltage of the DC bus is changed, causes the circuit switching element to constitute the first chopper circuit so as to perform the discharge operation to the DC bus, while stepping up the voltage of the power storage element.

5. The AC motor drive device according to claim 2, wherein at a time of power-on of the device, when a charge command is generated, the control circuit compares the voltage of the DC bus with the voltage of the power storage element, and when the voltage of the DC bus is higher than the voltage of the power storage element, causes the circuit switching element to constitute the first chopper circuit so as to perform the charge operation to the power storage element, while stepping down the voltage of the DC bus; and near a timing at which the voltage of the power storage element rises and the magnitude relation with the voltage of the DC bus is changed, causes the circuit switching element to constitute the second chopper circuit so as to perform the charge operation to the power storage element, while stepping up the voltage of the DC bus, until the voltage of the power storage element exceeds the voltage of the DC bus and reaches a preset initial charge voltage.

6. The AC motor drive device according to claim 2, wherein at a time of operation completion at which the device is powered off, when a discharge command is generated, the control circuit causes the circuit switching element to constitute the second chopper circuit so as to perform the discharge operation to the DC bus, while stepping down the voltage of the power storage element; and near a timing at which the voltage of the power storage element drops and the magnitude relation with the voltage of the DC bus is changed, causes the circuit switching element to constitute the first chopper circuit so as to perform the discharge operation to the DC bus, while stepping up the voltage of the power storage element, until the voltage of the power storage element reaches a discharge limit voltage, which is preset to be equal to or lower than the voltage of the DC bus.

7. The AC motor drive device according to claim 2, wherein the circuit switching element further includes a configuration in which connection between the positive terminal of the power storage element and the step-up/step-down bidirectional chopper circuit is opened.

8. The AC motor drive device according to claim 7, wherein when the circuit switching element constitutes the first chopper circuit, and when an abnormal signal is input from inside or outside of the device, the control circuit causes the circuit switching element to open the connection between the positive terminal of the power storage element and the other end of the choke coil.

9. The AC motor drive device according to claim 7, wherein when the circuit switching element constitutes the second chopper circuit, and when an abnormal signal is input from inside or outside of the device, the control circuit causes the circuit switching element to open the connection between the positive terminal of the power storage element and the positive terminal of the one switching element.

* * * * *